(12) United States Patent
Herreros

(10) Patent No.: US 6,317,451 B1
(45) Date of Patent: Nov. 13, 2001

(54) METHOD OF COMPRESSING A MULTIDIMENSIONAL SAMPLED SIGNAL

(75) Inventor: Yvan Herreros, Evry (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/145,348

(22) Filed: Sep. 1, 1998

(30) Foreign Application Priority Data

Sep. 4, 1997 (FR) .................................................. 97 11004

(51) Int. Cl.$^7$ ...................................................... H04N 7/30
(52) U.S. Cl. ............................................. 375/18; 382/248
(58) Field of Search ........................... 348/395.1, 420.1; 375/240.18, 240.19, 240.2; 382/248, 249, 252; H04N 7/30

(56) References Cited

U.S. PATENT DOCUMENTS

| | | | |
|---|---|---|---|
| 5,422,736 | * | 6/1995 | Katayama .......................... 348/395.1 |
| 5,883,978 | * | 3/1999 | Ono ...................................... 382/248 |
| 5,886,741 | * | 3/1999 | Srivastava ........................ 375/240.18 |
| 6,018,366 | * | 1/2000 | Asai et al. ....................... 375/240.18 |

FOREIGN PATENT DOCUMENTS 0 107 072 A2    5/1984    (EP) .

OTHER PUBLICATIONS

J. M. Shapiro, "Embedded Image Coding using Zerotrees of Wavelet Coefficients", Dec. 1, 1993, IEEE Transactions on Signal Processing, vol. 41, Nr. 12, pp. 3445–3462.

* cited by examiner

Primary Examiner—Howard Britton
(74) Attorney, Agent, or Firm—Sughrue, Mion, Zinn, Macpeak & Seas, PLLC

(57) ABSTRACT

A method of quantizing a multidimensional sampled signal including at least one multidimensional sample of given dimension N, the sample or each sample including N components, includes the steps of, for each sample, transforming each component into a set of transformed coefficients in N known numbering bases, combining the sets of transformed coefficients and progressively quantizing the combination of the sets of transformed coefficients. For combining the sets of transformed coefficients it includes the successive steps of creating, for the multidimensional sample or for each multidimensional sample, a vector the coefficients of which are N-tuplets formed by the transformed coefficients of the same rank i in the N bases of transformation of the characteristic variables and combining the vectors of N-tuplets. The method finally includes progressive quantizing of the combination of the vectors of N-tuplets. The progressive quantizing is effected on the N-tuplets.

6 Claims, 1 Drawing Sheet

METHOD OF COMPRESSING A MULTIDIMENSIONAL SAMPLED SIGNAL

BACKGROUND OF THE INVENTION

1. Field of the invention

The present invention concerns a method of quantizing a multidimensional sampled signal comprising at least one multidimensional signal of given dimension N, the or each sample including N components, the method including the steps of:

a) for each sample, converting each component into a set of transformed coefficients in N known numbering bases;

b) combining the sets of transformed coefficients; and c) progressively quantizing the combination of the sets of transformed coefficients.

The method is intended in particular for compressing signals representing color pictures, in particular TV pictures, stereophonic sound or data resulting from transforms such as Fourier transforms, discrete cosine transforms and wavelet transforms.

2. Description of the Prior Art

In the present context, each signal is formed of a set of transformed or not-transformed multidimensionsal samples of given dimension N. Thus each sample includes N components.

In the case of compressing a set of multidimensional sampled signals, existing compression schemes treat each component of the signal as an independent sub-signal. Each sub-signal is first transformed and then quantized independently of the other transformed sub-signals of the same multidimensional sampled signal.

For example, the three color planes (red, green, blue) of a color television picture are usually quantized independently of each other.

A quantizing method is described in "Embedded Image Coding Using Zerotrees of Wavelet Coefficients" by J. Shapiro (IEEE Trans. on Signal Processing, vol. 41, No 12, December 1993).

The work of J. Shapiro concerns a method of integrated progressive quantization of images with a plurality of levels of gray that have been subjected to wavelet transformation.

The proposed quantization process allows progressive transmission of the compressed data. Progressive quantization means that degraded information can be partially re-established from the compressed bit frame of which only a part has been received.

Accordingly, with a progressive quantizing process, the frame of bits obtained at a high compression level is the start of the frame of bits obtained at a lower compression level. In other words, increasing the compression level amounts to truncating the bit frame so as to retain only its beginning.

The algorithm of J. Shapiro transposed for processing color images, consisting in processing each color successively, does not allow for the correlations between the colors and this degrades compression performance.

A solution to these problems proposed by A. Said and W. A. Pearlman in "A New Fast and Efficient Image Codec Based on Set Partitioning In Hierachical Trees" (IEEE Trans. on Circuits & Systems for Video Technology, vol. 6, No 3, June 1996) aims among other things to transform characteristic variables corresponding to each of the colors beforehand by decorrelating them, in particular using a main component analysis method. Using this method, the three colors are transformed beforehand into a luminance component and two chrominance components. A. Said and W. A. Pearlman propose to apply a Karuhnen-Lowe transform to the various bands to decorrelate them.

However, using decorrelation necessitates an additional transformation, which is relatively time-consuming. Moreover, the operation is not reversible because of rounding off problems, and this degrades the quality of the reconstituted image, preventing its use in some fields, such as the medical field, for statutory reasons.

Using the above methods, the data frames include information relating to each of the colors in succession or, if the signal has been transformed beforehand, to luminance and then chrominance. Accordingly, the frame must be transmitted completely to enable satisfactory reconstitution of the image.

Any partial transmission of only a truncated frame yields only first information which on its own is insufficient to reconstitute a correct image. There is then the risk of losing all the information for one color plane or, if the signal has been transformed beforehand, some chrominance information.

To solve this problem A. Said and W. A. Pearlman propose mixing the components formed from the transformed characteristic variables by interleaving them following a particular form of sorting before quantizing the components combined in this way.

However, this method is relatively time-consuming because it necessitates the use of a particular sorting process.

Further, despite the interleaving of the components, quantizing being effected on each scalar coefficient transformed independently of the component to which it corresponds, a truncated data frame does not always convey the same number of information items for all the components representative of the image.

Accordingly, the above methods are not completely satisfactory.

An aim of the invention is to propose a method of quantizing a multidimensional sampled signal allowing for the high level of interdependence of the components of the multidimensional samples combined with effective exploitation of a truncated frame of the quantized signal.

SUMMARY OF THE INVENTION

To this end, the invention consists in a method of quantizing a multidimensional sampled signal including at least one multidimensional sample of given dimension N, the sample or each sample including N components, the process including the steps of:

a) for each sample, transforming each component into a set of transformed coefficients in N known numbering bases;

b) combining the sets of transformed coefficients; and c) progressively quantizing the combination of the sets of transformed coefficients; wherein for combining the sets of transformed coefficients it includes the following two successive steps:

A) creating, for the multidimensional sample or for each multidimensional sample, a vector the coefficients of which are N-tuplets formed by the transformed coefficients of the same rank i in the N bases of transformation of the characteristic variables; and B) combining the vectors of N-tuplets;

the method finally including the progressive quantizing of the combination of the vectors of N-tuplets, progressive quantizing being effected on the N-tuplets.

In particular embodiments, the method may have one or more of the following features:

the transformation of each component of each sample into a set of transformed coefficients in N known numbering bases is effected by direct transformation of each sample in a numbering base the base vectors of which are N-tuplets;

the vectors of N-tuplets are combined in the order of the multidimensional samples in the signal;

the progressive quantization step includes a step of conditional coding of certain elements of the same N-tuplet in accordance with the other elements of the N-tuplet concerned;

the multidimensional samples are obtained by preliminary transformation of a set of multidimensional information items each including N characteristic variables, the preliminary transformation effected on the multidirectional information items consisting of a set of independent transforms each operated on one of N planes consisting of characteristic variables of the same rank of the multidimensional information; and the signal is a signal representative of a digital color image.

The invention will be better understood after reading the following description given by way of example only and with reference to the drawings.

DETAILED DESCRIPTION OF THE PREFERRED EMBODIMENT

The use of the method will now be described using the example of compression of a three-dimensional sampled signal representing a 4 pixels by 4 pixels block of a color television picture.

Figure 1:
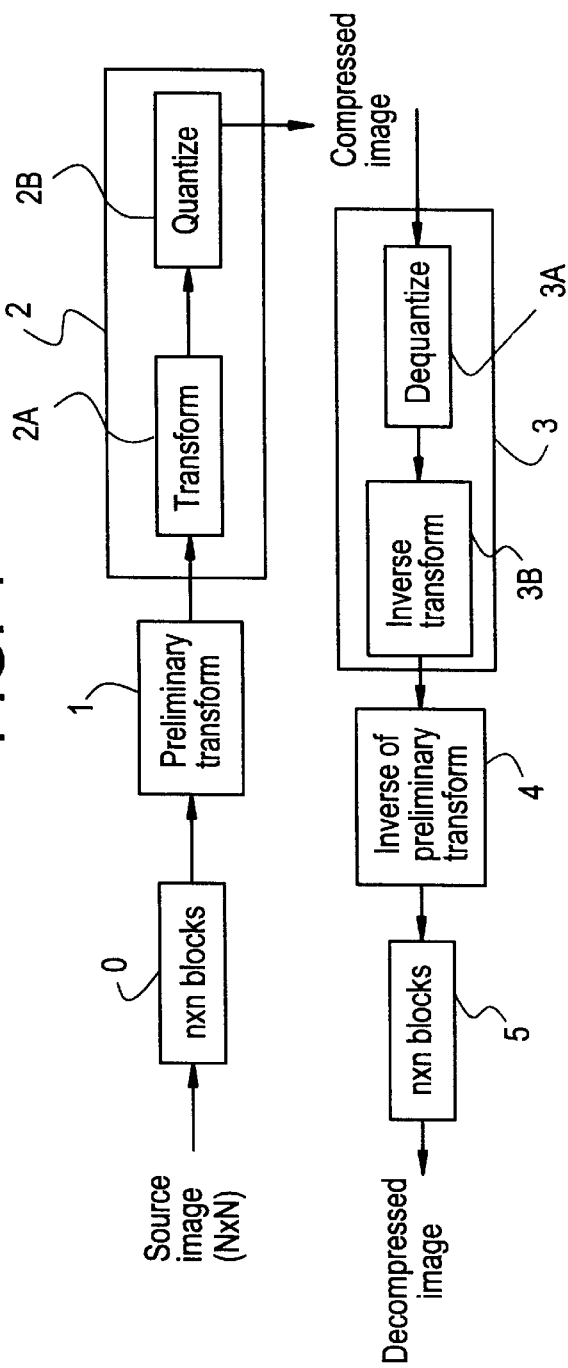
FIG. 1 is a diagram showing the general scheme of image compression and decompression.

FIG. 1 shows the general scheme of image compression.

Figure 2:
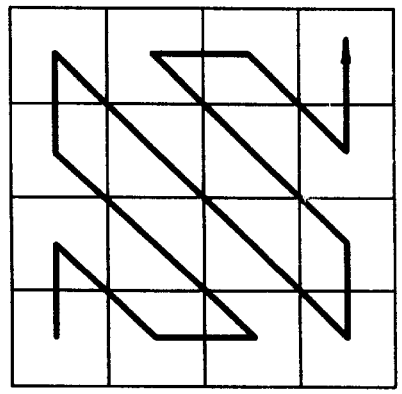
FIG. 2 is a diagrammatic view of a picture block comprising 4 pixels by 4 pixels showing the direction in which the block is scanned to quantize it.

In a manner that is known in itself, to compress a large image, the image is first (step 0) divided into a set of blocks of a predetermined small size, for example, 4 pixels by 4 pixels, as shown in FIG. 2.

The compression process is then applied to the blocks.

In the example described here, the signal includes 16 multidimensional information items each relating to one pixel. The information items are three-dimensional and therefore include three characteristic variables R, G, B each corresponding to one of the three colors (red, green, blue).

Characteristic variables of the same rank from all the multidimensional information items are transformed before quantizing (step 1). The set of characteristic variables of the same rank defines a plane corresponding here to one of the three colors.

Accordingly, each of the color planes is transformed in step 1. Three separate transformations are effected, each applied to one color plane. This produces, for each pixel, a transformed multidimensional information item called a sample and denoted $(\hat{R}, \hat{G}, \hat{B})$.

Many transforms can be used. Transforms that can be used for effective image compression fall into two main groups, namely "frequency-based" transforms derived from the Fourier transform and its approximations and "time-frequency" transforms, the best known representatives of which are the wavelet transforms which take account of the non-stationary nature of the signal.

The quantizing step (step 2) follows on from this preliminary transformation.

It begins with a step 2A which, for each sample, here an information item relating to a transformed pixel in a color plane, successively transforms each component, here one of the three transformed colors, into a set of transformed coefficients in three known numbering bases, each defined for one component.

Transformation step 2A therefore leads to the expression of the three components $\hat{R}, \hat{G}, \hat{B}$ of each sample $(\hat{R}, \hat{G}, \hat{B})$ in a numbering base of given size for each component. In the example described, the bases associated with the three components are deemed to be of dimension k=8, the transformed coefficients being binary numbers.

The components representative of the three colors are therefore written in the form:

$$\hat{R} = \sum_{i=0}^{7} 2^i r_i$$

$$\hat{G} = \sum_{i=0}^{7} 2^i g_i$$

$$\hat{B} = \sum_{i=0}^{7} 2^i b_i$$

with $(r_i, g_i, b_i) \in \{0,1\}^3$ for $i \in \{0;1;2;3;4;5;6;7\}$.

A vector is then constructed for each pixel of dimension k=8 and the coefficients of which are triplets formed by the transformed coefficients $(r_i, g_i, b_i)$ of the same rank i (with i in the range $\{0;1;2;3; 4;5;6;7\}$).

In practise, for transforming each component of each sample $(\hat{R}, \hat{G}, \hat{B})$ into a set of transformed coefficients in the three known numbering bases, each sample $(\hat{R}, \hat{G}, \hat{B})$ in a single numbering base, of dimension 8 in this example, is transformed directly. In this numbering base the transformed coefficients are triplets.

Accordingly, in this base, each sample is written in the form:

$$(\hat{R}, \hat{G}, \hat{B}) = \sum_{i=0}^{7} (r_i, g_i, b_i) 2^i$$

In the method of the invention, the vectors of triplets formed in this way are combined in the same order as the multidimensional samples in the signal to form a matrix of triplets corresponding to the transformed coefficients of the transformed multidimensional sampled signal.

This order is that shown in FIG. 2, for example.

One example of a matrix of the above kind is shown below in the form of a table.

|   | 0 RGB | 1 RGB | 2 RGB | 3 RGB | 4 RGB | 5 RGB | 6 RGB | 7 RGB | 8 RGB | 9 RGB | A RGB | B RGB | C RGB | D RGB | E RGB | F RGB |
|---|---|---|---|---|---|---|---|---|---|---|---|---|---|---|---|---|
| 7 | 101 | 000 | 000 | 000 | 000 | 000 | 000 | 000 | 000 | 000 | 000 | 000 | 000 | 000 | 000 | 000 |
| 6 | 110 | 101 | 100 | 000 | 000 | 000 | 000 | 000 | 000 | 000 | 000 | 000 | 000 | 000 | 000 | 000 |
| 5 | 111 | 010 | 011 | 111 | 100 | 000 | 000 | 000 | 000 | 000 | 000 | 000 | 000 | 000 | 000 | 000 |
| 4 | 111 | 111 | 010 | 110 | 011 | 111 | 101 | 000 | 000 | 000 | 000 | 000 | 000 | 000 | 000 | 000 |
| 3 | 110 | 001 | 101 | 001 | 110 | 001 | 110 | 111 | 110 | 100 | 100 | 000 | 000 | 000 | 000 | 000 |
| 2 | 100 | 101 | 001 | 100 | 010 | 001 | 101 | 110 | 001 | 011 | 011 | 101 | 100 | 000 | 010 | 000 |
| 1 | 111 | 010 | 001 | 100 | 011 | 101 | 010 | 101 | 010 | 100 | 010 | 110 | 011 | 111 | 011 | 000 |
| 0 | 111 | 101 | 100 | 010 | 011 | 010 | 001 | 100 | 010 | 101 | 010 | 100 | 010 | 011 | 101 | 111 |

Accordingly, in the table, the transformed coefficients associated with the base vectors are numbered 7 through 0 from the most significant to the least significant and appear along the rows. The 16 pixels of the picture block concerned are represented in the columns and are numbered in hexadecimal from 0 through F.

Each pixel is therefore represented by a vector of 8 triplets. The first element of each triplet corresponds to the transformed coefficient of the rank concerned of the first component (red in this example). The second and third elements of each triplet respectively correspond to the transformed coefficients of the second and third components (green and blue, respectively).

In accordance with the invention, the information grouped in table 1 is then quantized progressively. The progressive quantization is effected directly on the triplets.

In the context of the general scheme represented in FIG. 1, the progressive quantizing step 2B corresponds both to the usual quantizing step and to the usual coding step. Quantizing is usually understood as the process of eliminating the transformed coefficients that carry little information and which can be neglected without seriously degrading image quality. The usual form of coding consists in retranscribing the quantized transformed coefficients into a form reducing the length of the frame and suited to subsequent processing of the compressed image. Here progressive quantizing as described by J. Shapiro, for example, enables quantizing and coding to be carried out simultaneously.

The progressive quantizing is effected with a particular order of scanning the 16-pixel picture block. This can be of any appropriate type, for example the order shown in FIG. 2.

Accordingly, if E denotes the escape signal the compressed signal obtained by the method of the invention integrating only the first three most significant levels is expressed in the form:

101E/110101100E/111010011111100E

With a process of the above kind any truncated frame necessarily includes all of the information relating to the three colors for the quantizing level adopted. In particular, the number of bits for each level will necessarily be a multiple of three.

Because quantizing is effected directly on the triplets, it is certain that any truncation of the data frame will contain similar numbers of bits representative of each color.

In step 3 "progressive dequantizing" of the signal representative of the image is effected, starting with the signal compressed with the compression level adopted. With the schemes usually employed, "progressive dequantizing" consists in a "dequantizing" step 3A followed by an inverse transform step 3B which is the inverse of step 2A.

The process then includes a new inverse transform (step 4) which is the inverse of the preliminary transform done in step 1.

Finally, to reconstitute the complete decompressed image, the small picture blocks are reassembled in a final step (step 5 in FIG. 1).

In a variant of the method of the invention the quantizing step 2B can be conducted differently, and in particular conditionally.

In this variant, when quantizing a given triplet, the first transformed coefficient is left unchanged and the next two coefficients are encoded conditionally on the coding of the first transformed coefficient of the triplet concerned.

Accordingly, for each triplet, the second and third quantized coefficients are obtained on the basis of conditional probabilities relating to the first coefficient of the triplet concerned.

Transform step 1 is optional and can be omitted. The quantizing process of the invention is then applied directly to the multidimensional samples, the components of which are not multidimensional information transforms but the multidimensional information itself.

The quantizing process of the invention will now be described in more general terms, using an example of an algorithm in pseudo-code.

Consider a signal formed of a set of samples C. Each sample C is made up of N components $C_0, \ldots, C_{N-1}$.

Progressive quantizing uses two compatible relations of order:

a (total) order of scanning the samples (denoted<);

a (partial) order of logical dependency (denoted<<) such that for two samples x<<y ⇒x<y.

In "zerotree" coding, for example, as defined by J. Shapiro, << is the order of descendance in a tree and < is a conventional order of running through the tree (depth or width first).

The coefficients of a 4×4 matrix representative of a 4 pixels by 4 pixels picture block is designated as follows:

| (0,0) | (0,1) | (0,2) | (0,3) |
| (1,0) | (1,1) | (1,2) | (1,3) |
| (2,0) | (2,1) | (2,2) | (2,3) |
| (3,0) | (3,1) | (3,2) | (3,3) |

The order corresponding to "zerotree" coding is defined by:

for (i,j) other than (0,0)

(2i,2j)<<(i,j)

(2i+1,2j)<<(i,j)

(2i,2j+1)<<(i,j)

(2i+1,2j+1)<<(i,j)

one of the following (decreasing) orders can be chosen for<

Depth first (0,0) (0,1) (0,2) (0,3) (1,2) (1,3) (1,0) (2,0) (2,1) (3,0) (3,1) (1,1) (2,2) (2,3) (3,2) (3,3)

Width first
(0,0) (0,1) (1,0) (1,1) (0,2) (0,3) (1,2) (1,3)(2,0) (2,1) (3,0) (3,1) (2,2) (2,3) (3,2) (3,3)

The numbering base $R^N$ used here is the conventional base of powers of 2 and the coefficients of the decomposition (transformed coefficients) associated with each base vector are N-tuplets.

A sample is said to be significant relative to a threshold S if one of its components is above or equal to S (in absolute value).

There are two cases for coding a sample:
  if the sample has never been encoded
    the set of symbols is $\{-1, 0, 1\}^N$ plus
    the escape symbol E
  if the sample has already been encoded
    the set of symbols is $\{0, 1\}^N$ If all the samples below C (for the order <<) are not significant for the threshold S, then C is said to be a root of 0 for S.

To define the algorithm, k, the highest power of 2 below the highest non-zero sample (in absolute value), is determined.

The pseudo-code algorithm is then written in the following form:

for p decreasing from k to 0
  for all samples C in decreasing order (for <)
    if the current sample P has never been encoded
    (not yet regarded as significant)
      if it is not significant relative to $2^p$
        if it is below (for <<) a sample for which an escape symbol E has been encoded (a root of zero)
          go to next sample
        if not, if all samples below P (for <<) are non-significant relative to $2^p$
          encode escape symbol E
        if not (variant)
          encode symbol (0, . . . , 0)
      if not
        for each sample component
          if component is greater than or equal to $2^p$
            let $c_n=1$
          if not, if component is less than or equal to $-2^p$
            let $c_n=-1$
          if not
            let $c_n=0$
        encode symbol $(c_0, \ldots, c_{n-1})$ different from $(0, \ldots, 0)$
    if not
      for each sample component
        let $c_n$=value of $p^{th}$ bit of absolute value of component
      encode the symbol $(c_0, \ldots, c_{n-1})$ More generally, the process of the invention can be defined in the following manner, the samples C being elements of $R^N$ a (where R is the set of real numbers).

A numbering base in $R^N$ is defined by the following elements:
  a strictly increasing series B of real numbers $B_k$ (k∈Z with Z the set of relative integers) (in general, $B_k=2^k$)
  a finite set S of elements of $R^N$ comprising the null vector, these elements are called digits (generally S={-1, 0, 1}$^N$ or $\{0, 1\}^N$)

B and S must satisfy the following property:
any vector X of $R^N$ may be written (uniquely or not) in the form $$X = \sum_{k \in Z} x_k B_k \quad (x_k \in S)$$

Writing $$X = \sum_{k<K} x_k B_k$$

of X is said to be minimal if
$X_{K-1}$ is non-null
there is no writing of the form $$X = \sum_{k<K-1} x_k B_k$$

A vector X is said to be non-significant relative to $B_k$ if there is a minimal writing of X where $x_i=0$ for $i \geq k$.

It is assumed that all the samples are written in a minimal form and K, the largest value of k for writing all the samples, is determined.

The algorithm of the process of the invention is then written in the form:
for k decreasing from K to 0
  for all samples in decreasing order (for <)
    if current sample $$P = \sum_{k \leq K} p_k B_k$$

has never been encoded
    (not yet regarded as significant)
      if it is not significant relative to $B_k(p_k=\ldots=p_k=0)$
        if it is below (for <<) a sample for which an escape symbol has been encoded (a root of zeros)
          go to next sample
        if not, if all samples below P (for <<) are not significant relative to $B_k$
          encode escape symbol E
        if not (variant)
          encode symbol (digit) corresponding to null vector
      if not
        encode digit $p_k$
    if not
      encode digit $p_k$.

There is claimed:

1. A method of quantizing a multidimensional sampled signal including at least one multidimensional sample of given dimension N, the sample or each sample including N components, the process including the steps of:
  a) for each sample, transforming each component into a set of transformed coefficients in N known numbering bases;
  b) combining the sets of transformed coefficients; and
  c) progressively quantizing the combination of the sets of transformed coefficients;
wherein
for combining the sets of transformed coefficients it includes the following two successive steps:
  A) creating, for the multidimensional sample or for each multidimensional sample, a vector the coefficients of which are N-tuplets formed by the transformed coefficients of the same rank i in the N bases of transformation of the characteristic variables; and B) combining the vectors of N-tuplets;

the method finally including progressive quantizing of the combination of the vectors of N-tuplets, progressive quantizing being effected on the N-tuplets.

2. A method as claimed in claim 1 wherein the transformation of each component of each sample into a set of transformed coefficients in N known numbering bases is effected by direct transformation of each sample in a numbering base the base vectors of which are N-tuplets.

3. A method as claimed in claim 1 wherein the vectors of N-tuplets are combined in the order of the multidimensional samples in the signal.

4. A method as claimed in claim 1 wherein the progressive quantization step includes a step of conditional coding of certain elements of the same N-tuplet in accordance with the other elements of the N-tuplet concerned.

5. A method as claimed in claim 1 wherein the multidimensional samples are obtained by preliminary transformation of a set of multidimensional information items each including N characteristic variables, the preliminary transformation effected on the multidirectional information items consisting of a set of independent transforms each operated on one of N planes consisting of characteristic variables of the same rank of the multidimensional information.

6. A process claimed in claim 1 wherein the signal is a signal representative of a digital color picture.

* * * * *